(12) United States Patent
Gupta

(10) Patent No.: US 6,389,410 B1
(45) Date of Patent: May 14, 2002

(54) METHOD FOR MINIMIZING THE NUMBER OF SORTS REQUIRED FOR A QUERY BLOCK CONTAINING WINDOW FUNCTIONS

(75) Inventor: Abhinav Gupta, Menlo Park, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/656,905

(22) Filed: Sep. 7, 2000

(51) Int. Cl.[7] .............................................. G06F 17/30
(52) U.S. Cl. ..................... 707/2; 707/3; 707/4; 707/5; 707/6; 707/7
(58) Field of Search ............................... 707/3, 4, 5, 6, 707/7, 2

(56) References Cited

U.S. PATENT DOCUMENTS

| | | | |
|---|---|---|---|
| 5,555,403 A | * 9/1996 | Cambot et al. | 707/3 |
| 5,566,330 A | * 10/1996 | Sheffield | 707/1 |
| 5,701,456 A | * 12/1997 | Jacopi et al. | 707/3 |
| 5,897,632 A | 4/1999 | Dar et al. | 707/2 |
| 6,125,360 A | 9/2000 | Witkowski et al. | 707/2 |
| 6,134,543 A | 10/2000 | Witkowski et al. | 707/2 |
| 6,199,063 B1 | 3/2001 | Colby et al. | 707/4 |

OTHER PUBLICATIONS

Chaudhuri, Surajit et al., "Optimizing Queries with Materialized Views", Proceedings of the Eleventh International Conference on Data Engineering, Mar. 6–10, 1995, pp. 190–200.

Gopalkrishnan, Vivekanand et al., "Issues of Object–Relational View Design in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

* cited by examiner

*Primary Examiner*—Diane D. Mizrahi
(74) *Attorney, Agent, or Firm*—Hickman Palermo Truong & Becker LLP; Edward A. Becker; Carina M. Tan

(57) ABSTRACT

Techniques are described for reducing the number of sort operations required for a query that contains window functions. The techniques involves determining a set of Partition By and Order By clause pairs that corresponds to the set of window functions and then grouping the Partition By and Order By clause pairs into Ordering Groups where each Ordering Group may be satisfied by a single sort operation. From the set of Ordering Groups, a minimal set of Ordering Groups is determined. The techniques account for the interaction of orderings from Group By and Order By clauses in the query block.

18 Claims, 9 Drawing Sheets

Select the one or more expressions in each non-empty Partition By Clause with the least number of expressions.

318

Discard any duplicate expressions selected at block 316 or at block 318 to create & store a set of distinct selected expressions

320

In the subset of Partition By & Order By clause pairs, shorten the Partition By & Order By Clause pairs by removing the one or more selected distinct expressions

322

Add the one or more distinct selected expressions to the respective orderings corresponding to the Partition By & Order By clause pairs

324

Go to block 308 of FIG. 3B

FIG. 3D

METHOD FOR MINIMIZING THE NUMBER OF SORTS REQUIRED FOR A QUERY BLOCK CONTAINING WINDOW FUNCTIONS

FIELD OF THE INVENTION

The present invention relates generally to database query operations performed within computer systems and, more specifically, to minimizing the number of sort operations required for a database query containing window functions.

BACKGROUND OF THE INVENTION

Relational databases store information in tables that are organized into rows and columns. A user retrieves information from the tables by entering a request that is converted to queries by a database application, which then submits the queries to a database server. In response to the queries, the database server accesses the tables specified by the queries to determine which information within the tables satisfies the queries. The information that satisfies the queries is then retrieved by the database server and transmitted to the database application and ultimately to the user.

Online analytical processing ("OLAP") applications, also known as decision support processing applications, are applications that provide analysis over large volumes of data stored in a database. Analytic calculations are critical for data warehousing applications. Examples of analytic functions are those functions used in basic business intelligence calculations such as moving averages, rankings and lead/lag comparisons of data. Analytic functions are broadly classified as window functions. Window functions are so named because they operate over a set of rows of data in the database tables. The set of rows upon which the window functions operate are described by a window definition. The window definition describes which rows qualify for the window. The window has a starting row and an ending row. For example, a window defined for a moving average would have both the starting and end points of the window slide so that the end points maintain a constant physical or logical range. For example, the following query calculates a 3 month moving average per stock ticker.

AVG (stock_price) OVER (Partition By (stock_name) Order By (time) RANGE '3' MONTH PRECEDING)

The clause "Partition By (stock_name)" partitions the data by stock_name, and the clause "Order By (time)" orders the data within a partition by time. RANGE '3' MONTH PRECEDING is a logical expression of window size. In this example, the "window" has the logical size of three months. Alternatively, window size may be expressed by a physical interval. That is, the interval includes a certain number of rows before and after the current row in the ordered set of rows (ordered based on ORDER By columns in window function.) For example, the following query calculates the moving average for each stock ticker over 90 preceding rows of data.

AVG (stock_price) OVER (Partition By (stock_name) Order By (time) ROWS 90 PRECEDING)

TABLE 1 below illustrates a result set for the-query containing the window function "AVG (stock_price) OVER (Partition By (stock_name) Order By (time) RANGE '3' MONTH PRECEDING)". The above window function calculates a moving average of stock price for each stock within a three month window.

TABLE 1

| stock_name | Time | stock_price | moving_average |
|---|---|---|---|
| ORCL | Jan. 1, '99. | 20 | 20 |
| ORCL | Feb. 1, '99. | 30 | (20 + 30)/2 = 25 |
| ORCL | Mar. 1, '99. | 58 | (20 + 30 + 58)/3 = 36 |
| ORCL | Apr. 1, '99. | 11 | (30 + 58 + 11)/3 = 33 |
| ORCL | May 1, '99. | 51 | (58 + 11 + 51)/3 = 40 |
| ABCD | Jan. 1, '99. | 25 | 25 |
| ABCD | Feb. 1, '99. | 35 | (25 + 35)/2 = 30 |
| ABCD | Mar. 1, '99. | 45 | (25 + 35 + 45)/3 = 35 |
| ABCD | Apr. 1, '99. | 55 | (35 + 45 + 55)/3 = 45 |
| ABCD | May 1, '99. | 65 | (45 + 55 + 65)/3 = 55 |

Thus, the use of window functions enhances developer productivity because window functions allow for a succinct representation of otherwise, complicated queries. However, a separate sort is typically required for each window function. In addition, when the query block that contains window functions also contains "Group By" and/or "Order By" clauses, additional sorts are required. Thus, the number of sorts is greater than or equal to the number of window functions in the query. A typical query contains multiple window functions. The computation time required for the total number of sorts may be massive.

Based on the foregoing, there is clear need for a mechanism for minimizing the number of sort operations that are required to satisfy a query that contains window functions.

SUMMARY OF THE INVENTION

Techniques are provided for minimizing the number of sort operations that are required for satisfying a query containing a set of window functions. According to one embodiment, the window functions are grouped into Ordering Groups. An Ordering Group is a subset of the window functions, which are capable of being satisfied by a particular sort operation.

According to one embodiment, the Ordering Groups are constructed around the window functions that require the most restrictive sort operations. From the set of Ordering Groups, a minimal set of Ordering Groups is selected. The number of sort operations corresponding to the minimal set of Ordering Groups is the minimal number of sort operations needed to satisfy the sorting requirements of the set of window functions.

Since "GROUP BY" & "ORDER BY" clauses of the query block are mapped to window functions, the minimal set of ordering groups represents the minimal number of sort operations required for the whole query block excluding join operations.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A, FIG. 3B, FIG. 3C, FIG. 3D are flowchart that illustrates details for determining a set of Ordering Groups from which the minimal set of Ordering Groups is selected;

DETAILED DESCRIPTION OF THE PREFERRED EMBODIMENT

Techniques are provided for minimizing the number of sorts required for a query containing window functions. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Figure 1:
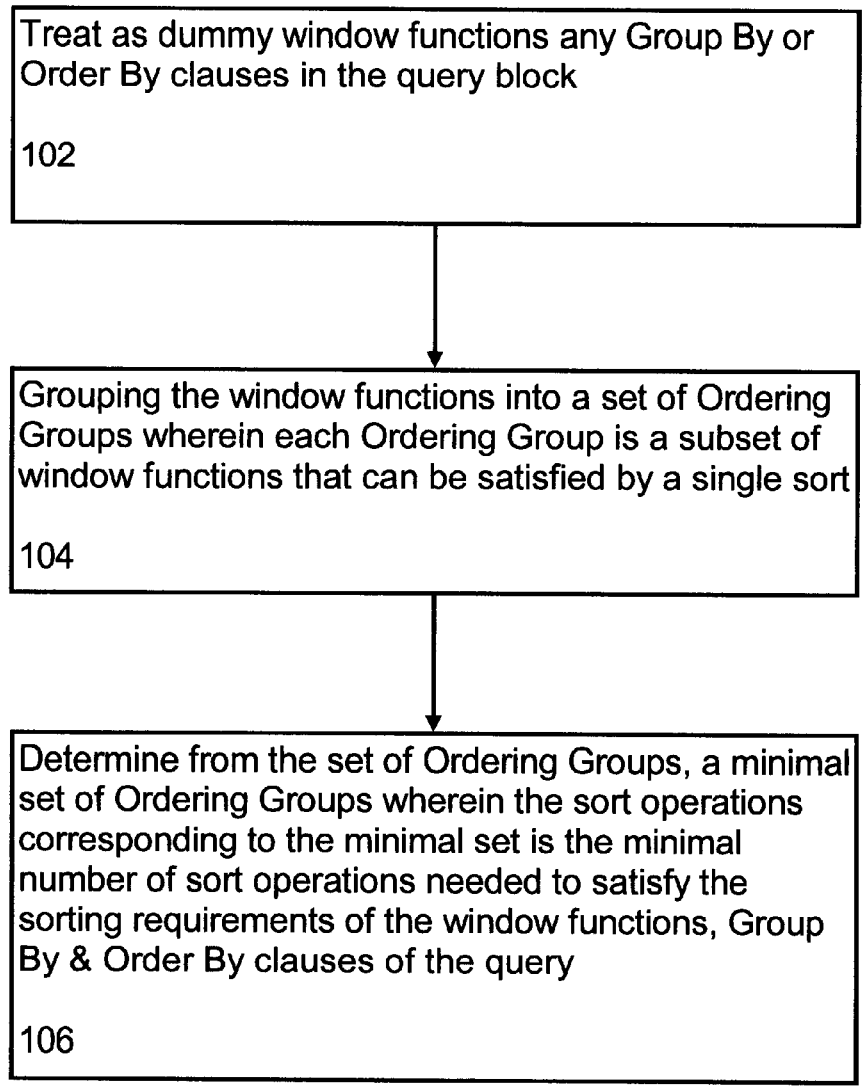
FIG. 1 is a flowchart that illustrates steps performed in a technique that implements one embodiment of the invention.

FIG. 1 is a flowchart that illustrates steps performed in a technique that implements one embodiment of the invention. At block 102 of FIG. 1, any Group By clause or Order By clause in the query block is treated as a dummy window function for the purposes of computing the minimal number of sorts. At block 104, the set of window functions in the query block, including the dummy window functions are grouped into sets of Ordering Groups. Subsets of window functions where each subset can be satisfied by a single sort operation are herein referred to as Ordering Groups. At block 106, from the set of Ordering Groups, a minimal set of Ordering Groups is determined. The number of sort operations corresponding to the minimal set of Ordering Groups is the minimal number of sort operations needed to satisfy the sorting requirements of the set of window functions, and Group By and Order By clauses of the query.

Referring to block 102, Group By queries and Order By queries that are in the query block are treated as dummy window functions in order to take into account the sorting required for Group By and Order By queries in addition to the sorting required for window functions before computing the minimal number of sort operations. An example of a query block containing window functions (indented portion of the query block) as well as Group By and Order By clauses in the query block (non-indented portion of the query block) is as follows:

SELECT SUM (Sales),
    SUM (SUM (sales)) OVER (PARTITION BY region ORDER BY state),
    RANK ( ) OVER (ORDER BY SUM (sales))
FROM sales_table
GROUP BY region, state
ORDER BY SUM (sales)

A Group By clause may be treated as a dummy window function that only has a Partition By clause containing the same expressions as that of the Group By clause in the query. The reason that a Group By query may be treated as a dummy window function using a Partition By clause is that both the Group By query and the Partition By clause have the same commutative property with respect to the sort operation. That is, they both may be computed by sorting on any commutation of the expressions that they each contain. The commutative sort property shared by the Group By query and the Partition By clause may be illustrated by the following:

The query, "Select from sales_table Group By a, b", may computed by sorting on "a, b" or by sorting on "b, a". Similarly, the Partition By clause in "SUM (sales) OVER (Partition By (a, b)" may be computed by sorting on "a, b"or by sorting on "b, a". Thus, Group By (expr 1, expr 2, expr 3 . . . expr m) may be treated as a window function with Partition By (expr 1, expr 2, expr 3 . . . expr m).

An Order By clause in the query block may be treated as a dummy window function that only has an Order By clause containing the same expressions as that of the Order By clause. For example, the query, "SELECT from sales_table ORER BY (a, b)", and the window function, "RANK ( ) OVER (ORDER BY (a, b))", both require data to be sorted in the strict order of "a, b". Thus, according to one embodiment of the invention, the set of window functions may include dummy window functions.

Referring to block 104, the concept of Ordering Groups, which are subsets of window functions where each subset may be satisfied by a single sort operation, may be illustrated by the following example.

Assume that a query contains the following multiple window functions A1, A2, A3:

A1) SUM (sales) OVER (PARTITION BY region) sum_region,

A2) SUM (sales) OVER (PARTITION BY region, state) sum_region_state,

A3) RANK ( ) OVER (PARTITION BY region ORDER BY sales DESC) rank.

Each of the above window functions requires a sort operation. Window function A1 requires a sort on "region". Window function A2 requires a sort on any permutation of "region, state". Window function A3 requires a sort on "region, sales DESC". However, by simply sorting the data once on "region, state" only, both window functions A1 and A2 would be satisfied in one operation. Thus, window functions A1 and A2 may be grouped together as an Ordering Group because they can be satisfied by a single sort operation on "region, state". The remaining Window function A3 would then be classified as another Ordering Group by default. However, if for example the above query contains an additional window function A4, SUM (Sales) Over (Partition By region, sales), which requires a sort on "region, sales", then window functions A3 and A4 may be grouped as an Ordering Group because they can be satisfied by a single sort operation by sorting on "region, sales DESC". Ordering Groups are described in greater detail herein with reference to FIG. 2A, FIG. 2B and FIG. 3A, FIG. 3B, FIG. 3C, FIG. 3D.

PARTITION BY AND ORDER BY CLAUSES IN WINDOW FUNCTIONS

Window functions allow users to divide query result sets into groups of rows called "partitions". Thus, references herein to partitions in the context of window functions are unrelated to the partitioning models for managing very large tables and indexes. Examples of partitioning models for managing very large tables and indexes are hash partitioning and composite partitioning. Referring to Table 1 herein, in response to the query "AVG (stock_price) OVER (Partition By (stock_name) Order By (time) RANGE '3' MONTH PRECEDING)", the query result set is divided in groups of rows where each group of rows corresponds to a stock name. An example of groups of rows called "partitions" in a query result set is illustrated in Table 1, which shows a group of rows or "partition" for ORCL stocks and a "partition" for ABCD stocks.

TABLE 1

| stock_name | Time | stock_price | moving_average |
|---|---|---|---|
| ORCL | Jan. 1, '99. | 20 | 20 |
| ORCL | Feb. 1, '99. | 30 | (20 + 30)/2 = 25 |
| ORCL | Mar. 1, '99. | 58 | (20 + 30 + 58)/3 = 36 |
| ORCL | Apr. 1, '99. | 11 | (30 + 58 + 11)/3 = 33 |
| ORCL | May. 1, '99. | 51 | (58 + 11 + 51)/3 = 40 |
| ABCD | Jan. 1, '99. | 25 | 25 |
| ABCD | Feb. 1, '99. | 35 | (25 + 35)/2 = 30 |
| ABCD | Mar. 1, '99. | 45 | (25 + 35 + 45)/3 = 35 |
| ABCD | Apr. 1, '99. | 55 | (35 + 45 + 55)/3 = 45 |
| ABCD | May 1, '99. | 65 | (45 + 55 + 65)/3 = 55 |

Figure 2A:
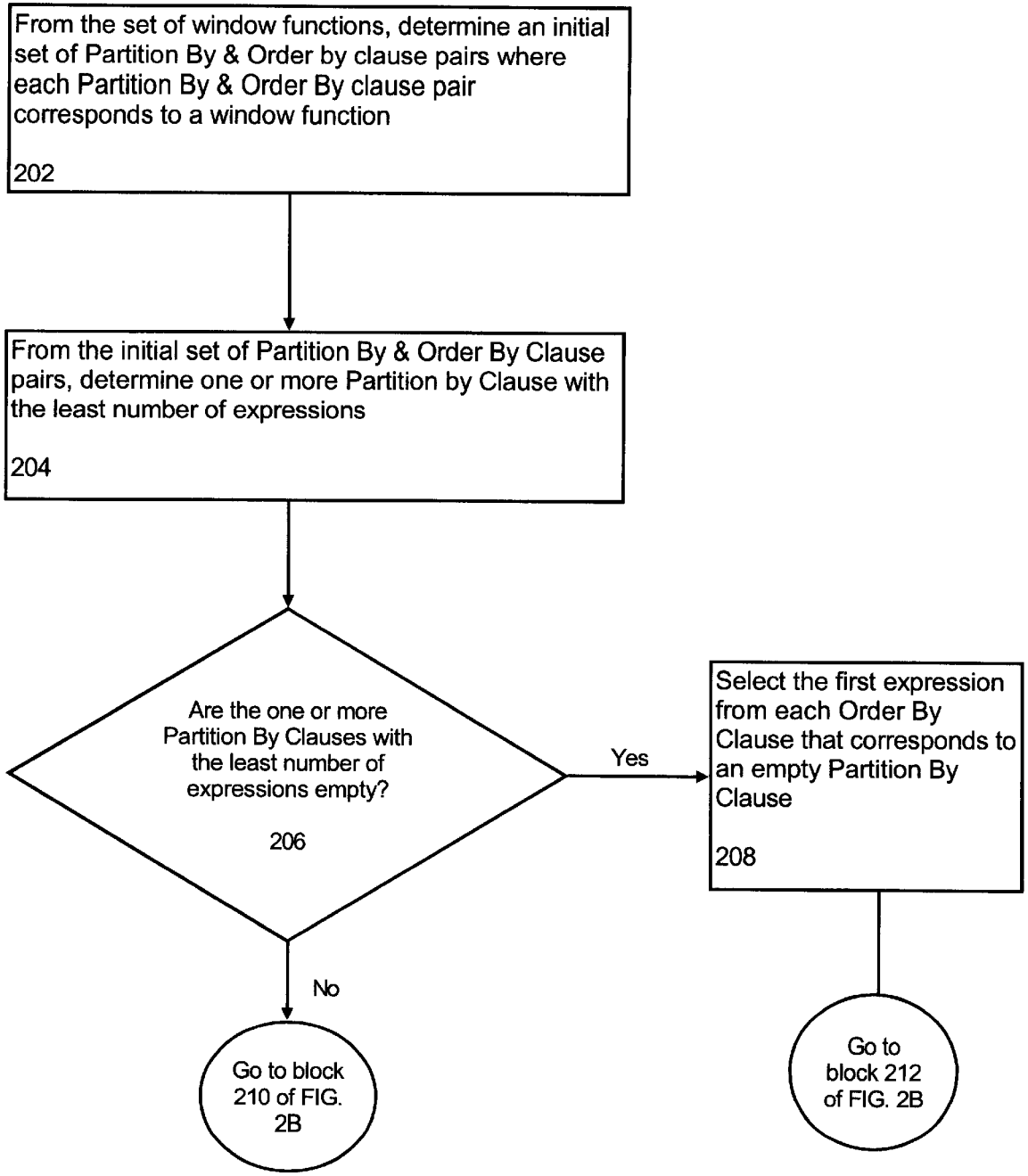
FIG. 2A, and FIG. 2B are flowcharts that illustrates an overview for determining a set of Ordering Groups.
Figure 2B:
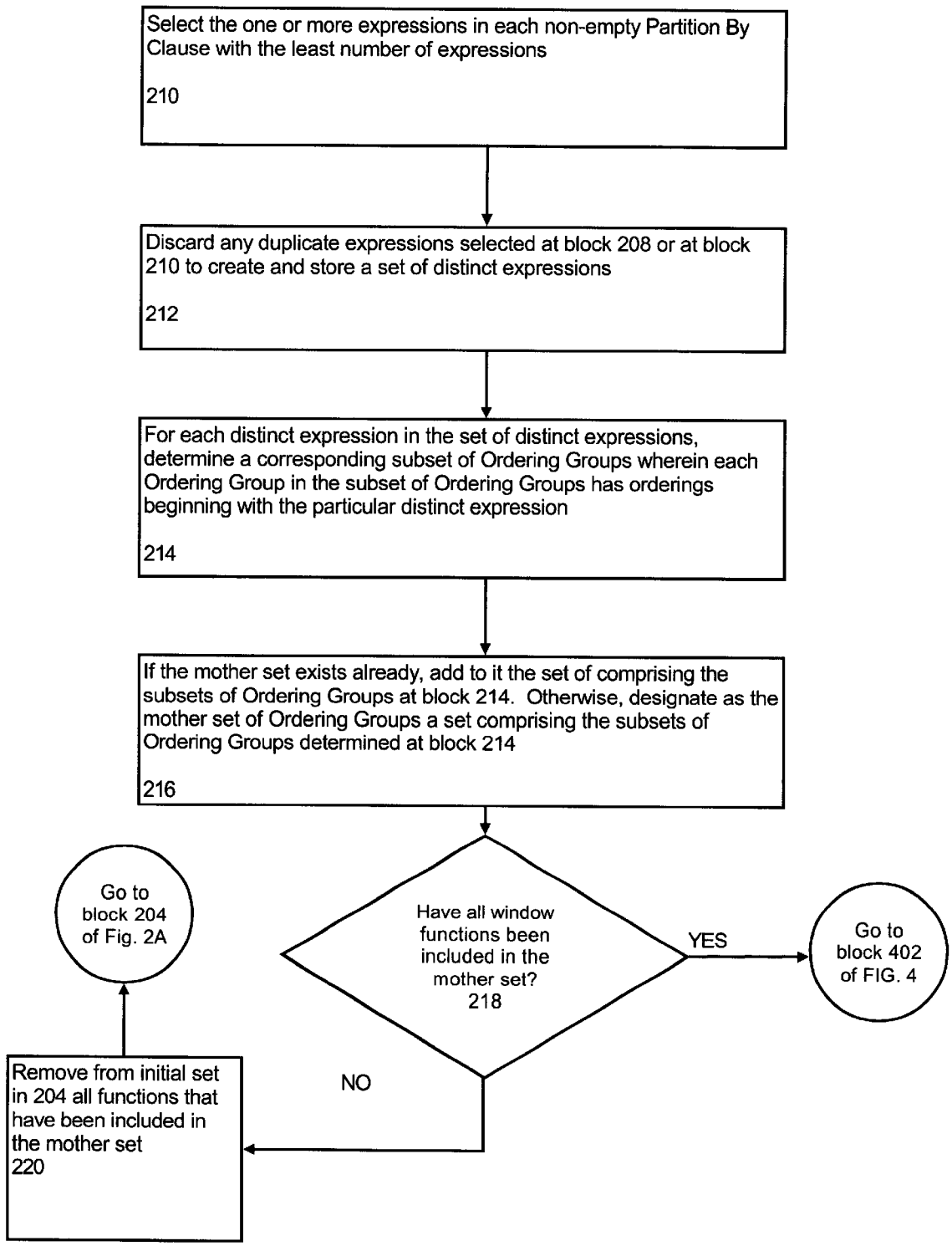

FIG. 2A and FIG. 2B are flow charts that illustrate an overview of determining a set of Ordering Groups based on the Partition By and Order By clauses corresponding to the set of window functions for which a set of Ordering Groups is to be determined. At block 202 of FIG. 2A, an initial set of Partition By and Order By clause pairs are determined from the set of window functions, where each Partition By and Order By clause pair corresponds to a window function. In one embodiment of the invention, only the Partition By and Order By clauses contained in the window functions are relevant to the method of determining Ordering Groups and a minimal set of Ordering Groups therefrom. While window functions may contain other clauses, only the use Partition By and Order By clauses will be discussed herein. Thus, at block 202, an initial set of Partition By and Order By clause pairs are used to represent the set of window functions for which a minimal set of Ordering Groups are to be determined. Other portions of the window functions may be ignored for the purposes of the embodiment. For example, the window function:

RANK ( ) OVER (PARTITION BY x
ORDER BY SUM(y))
As rank_of_product_per_x
is represented by the Partition By and Order By clause pair:
P(x) O(SUM(y))

For purposes of facilitating the explanation of the embodiment, in the case where a window function from the set of window functions only has an Order By clause, the Partition By and Order By clause pair used to represent the window function may be written with the Partition By clause having an empty expression. Similarly for the sake of symmetry, in the case where a window function from the set of window functions only has a Partition By clause, the Partition By and Order By clause pair used to represent the window function may be written with the Order By clause having an empty expression.

For example, the window function:
RANK ( ) OVER (ORDER BY y)
is represented by the Partition By and Order By clause pair:
P( ) O(y)
Similarly, the window function:
RANK ( ) OVER (PARTITION BY y)
is represented by the Partition By and Order By clause pair:
P(y) O( )

At block 204, from the initial set of Partition By and Order By clause pairs, one or more Partition By clauses with the least number of expressions are determined. A window function with the least number of expressions in its Partition By clause is the most restrictive in the context of ordering requirements. Thus, such window functions are selected for constructing Ordering Groups around them. For example, assume that the following Partition By and Order By clause pairs represent a set of window functions:

Window function A→P(x, y, z) O( )→requires sort on any permutation of (x, y, z)
Window function B→P(y, x) O( )→requires sort on any permutation of (x, y)
Window function C→P(x) O( )→requires sort on (x)
P(x) is the Partition By clause with the least number of Partition By expressions.

Window function C, represented by P(x), requires an ordering on "x". However, if the data is sorted on (x, y, z), then all three window functions A, B and C can be satisfied.

At block 206, it is determined whether the one or more Partition By clauses with the least number of expressions is empty. A Partition By clause such as P( ) would qualify as a Partition By clause with the least number of expressions.

If it is determined that the one or more Partition By clauses with the least number of expressions is empty, then at block 208, the first expression from each Order By clause that corresponds to an empty Partition By clause is selected. The reason that the first expression from each Order By clause that corresponds to an empty Partition By clause is selected is that a window function that only has an Order By clause has the identical sorting requirements as the window function that has a Partition By clause that contains a single expression that is the first expression from the Order By clause. For example:

O(a1, a2, a3) has the identical sorting requirements as P(a1) O(a2, a3)

If it is determined that the one or more Partition By clauses with the least number of expressions is not empty, then control is passed to block 210 of FIG. 2B. At block 210 of FIG. 2B, if it is determined that the one or more Partition By clauses with the least number of expressions is not empty, then the one or more expressions in each non-empty Partition By clause with the least number of expressions are selected.

At block 212 of FIG. 2B any duplicate expressions selected at block 208 of FIG. 2A or at block 210 of FIG. 2B are discarded to create and store a set of distinct expressions. At block 214 of FIG. 2B, determine a corresponding subset of Ordering Groups for each distinct expression in the set of distinct expressions, and wherein each Ordering Group in the subset of Ordering Groups has an ordering that begins with the particular distinct expression. Further details of block 214 are described herein with reference to FIGS. 3A, 3B, 3C, and 3D. At block 216 of FIG. 2B, if it is determined that a mother set of Ordering Groups already exists then the subsets of ordering groups determined at block 214 are added to the existing add to the mother set, otherwise, a mother set is created by designating as the mother set a set comprising the subsets of Ordering Groups determined at block 214. At block 218, it is determined whether all the window functions been included in the mother set of ordering groups. If all the window functions have not been included in the mother set, then at block 220, the functions that have been included in the mother set are removed from the initial set of Partition By & Order By clause pairs at block 204 of FIG. 2A and control passes back to block 204 of FIG. 2A. Otherwise, control passes block 402 of FIG. 4.

ORDERING GROUPS

FIG. 3A, FIG. 3B, FIG. 3C, FIG. 3D, are flow charts that illustrate details for determining a subset of Ordering Groups whose orderings begin with a distinct expression selected from the set of distinct expressions that was determined at block 212 of FIG. 2B. Thus, a subset of Orderings Groups is determined corresponding to every distinct expression in the set of distinct expressions. These subsets of Ordering Groups together comprise the mother set of Ordering Groups from which the minimal set of Ordering Groups is determined. Recall that the number of sort operations corresponding to the minimal set of ordering groups is the minimal number of sort operations needed to satisfy the sorting requirements of the corresponding set of window functions.

Figure 3A:
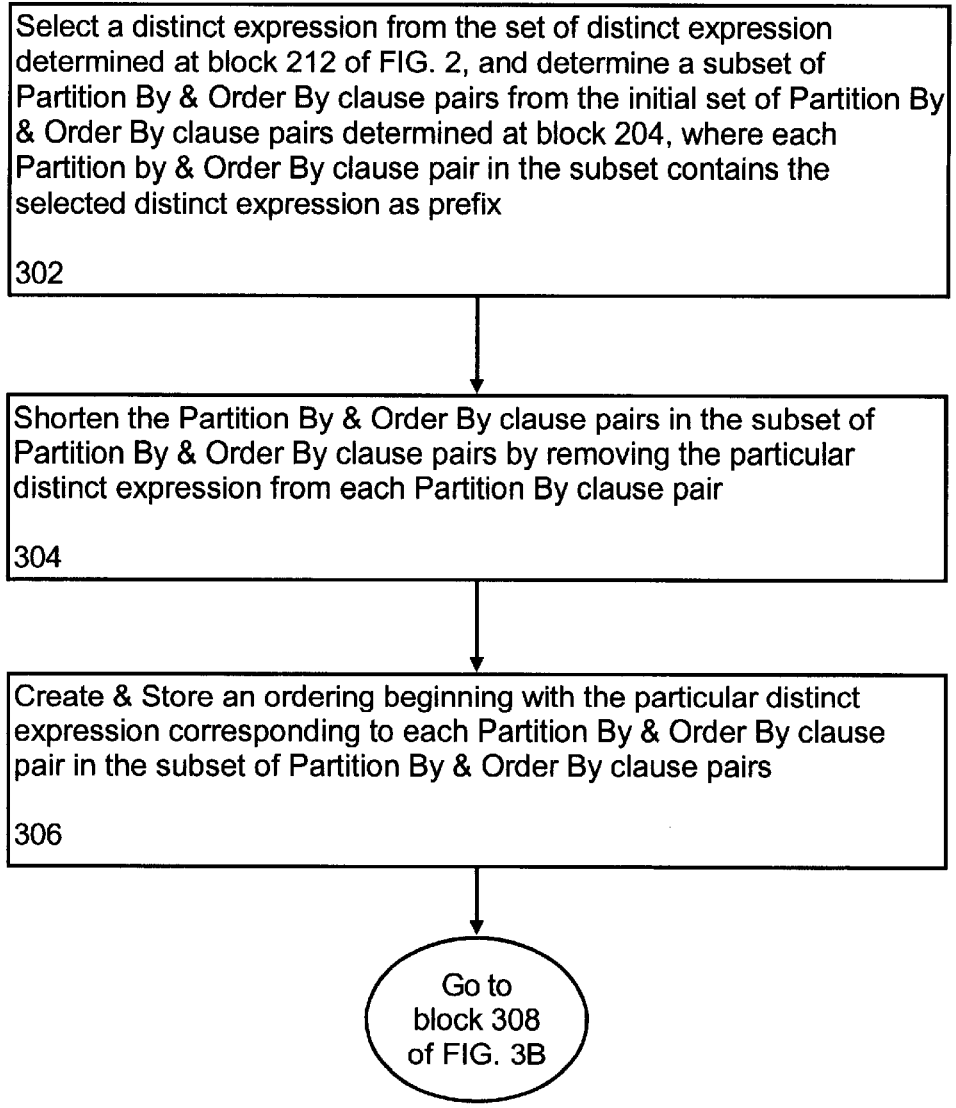

At block 302 of FIG. 3A, a distinct expression is selected from the set of distinct expressions that was determined at block 212 of FIG. 2B, and a subset of Partition By and Order By clause pairs is determined from the initial set of Partition By and Order By clause pairs that contain the least number of expression (determined at block 204 of FIG. 2A), where each Partition By and Order By clause pair in the subset contains the selected distinct expression.

At block 304, the Partition By and Order By clause pairs in the subset of Partition By and Order By clause pairs are shortened by removing the particular distinct expression from each Partition By and Order By pair. At block 306, an ordering beginning with the particular distinct expression is created and stored corresponding to each Partition By and Order By clause pair in the subset of Partition By and Order By clause pairs.

Figure 3B:
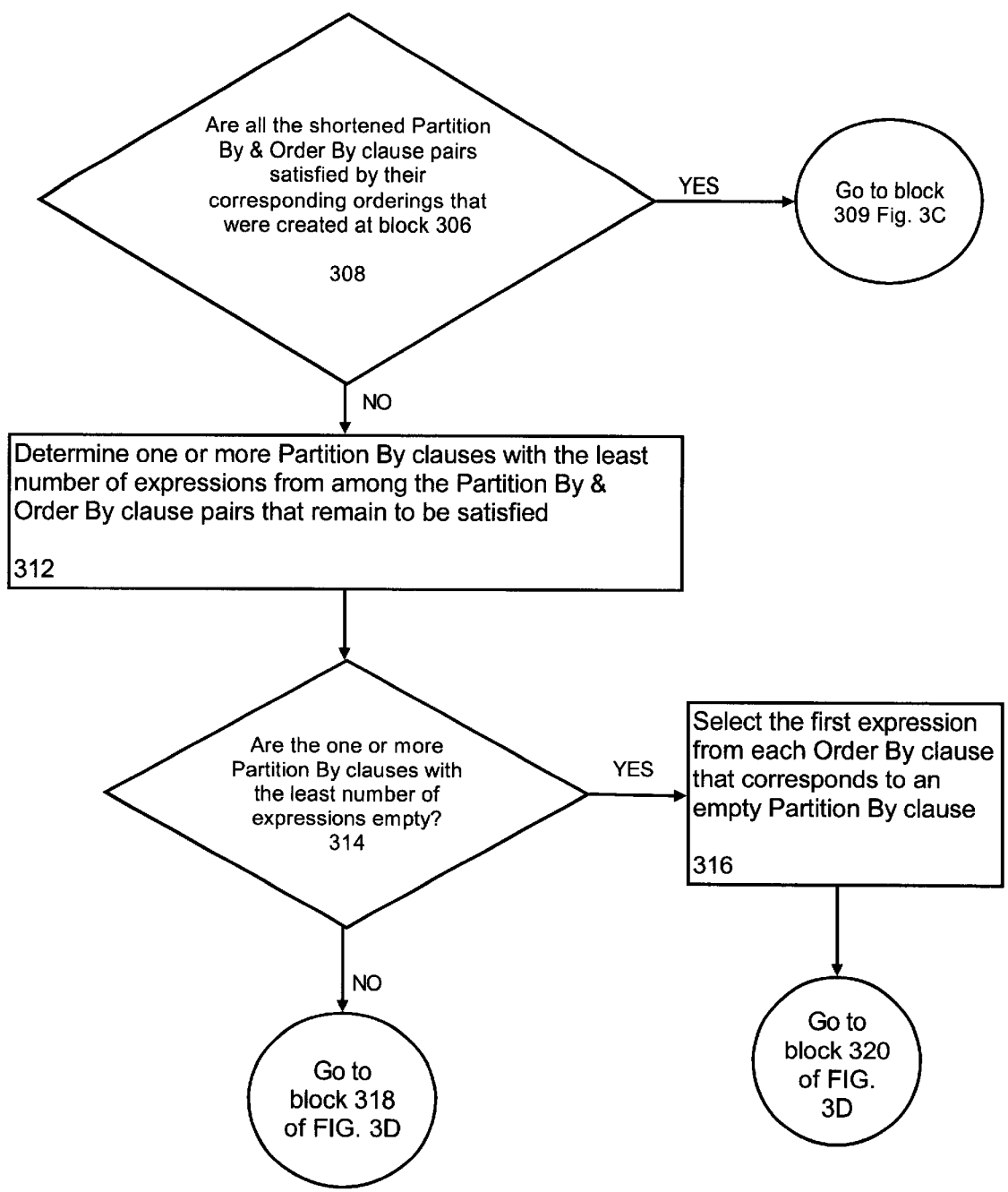
Figure 3C:
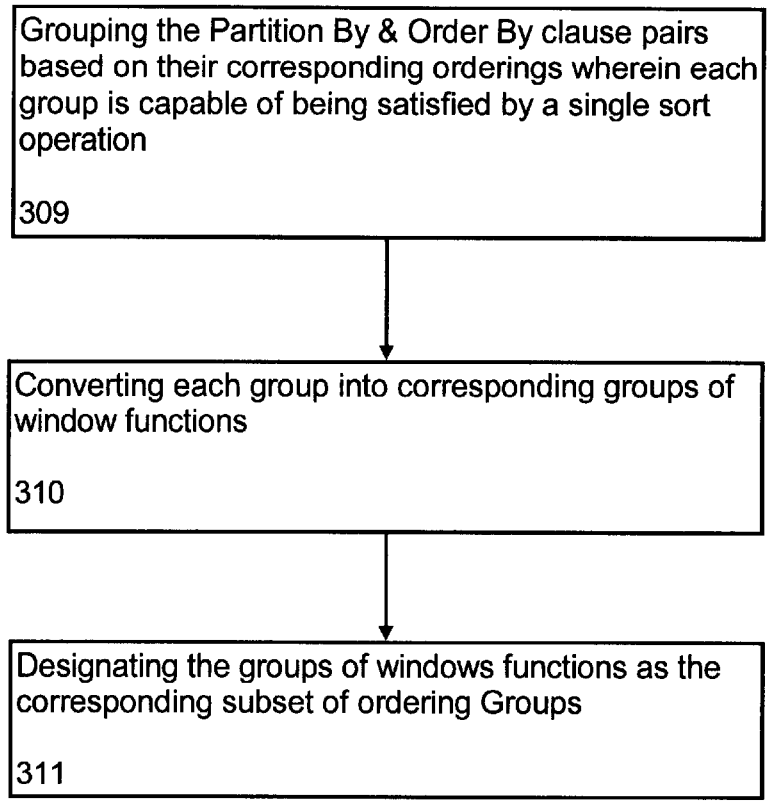

At block 308 of FIG. 3B, it is determined whether all the shortened Partition By and Order By clause pairs have been satisfied by their corresponding orderings that were created at block 306 of FIG. 3A. This is indicated by shortened Partition By & Order By expression pairs becoming empty. The shortened Partition By and Order By clause pairs are satisfied by their corresponding orderings if the sort operation pursuant to the corresponding orderings satisfy the sorting requirements of the shortened Partition By and Order By clause pairs. If it is determined that all the shortened Partition By and Order By clause pairs have been satisfied by their corresponding orderings, then at block 309 of FIG. 3C the Partition By and Order By clause pairs are grouped based on their corresponding orderings. At block 310 of FIG. 3C, each group that was created at block 309 is converted into corresponding groups of window functions. At block 311 of FIG. 3C, the groups of window functions that were created at block 310 is designated as the corresponding subset of Ordering Groups.

If it is determined that not all the shortened Partition By and Order By clause pairs have been satisfied by their corresponding ordering, then at block 312 of FIG. 3B, from among the Partition By and Order By clause pairs that remain to be satisfied in the subset of Partition By and Order By clause pairs, one or more Partition By clauses with the least number of expressions are determined.

At block 314 of FIG. 3B, it is determined whether the one or more Partition By clauses with the least number of expressions are empty. If it is determined that the one or more Partition By clauses with the least number of expressions are empty, then at block 316 of FIG. 3B, the first expression from the Order By clause in each Partition By and Order By clause pair that contains the empty Partition By clause is selected. Otherwise, at block 318 of FIG. 3D, the one or more expressions in each non-empty P clause with the least number of expressions are selected.

At block 320 of FIG. 3D, any duplicate expressions that were selected at block 316 of FIG. 3B or at block 318 of FIG. 3D are discarded to create and store a set of distinct selected expressions. At block 322 of FIG. 3D, in the subset of Partition By and Order By clause pairs, the Partition By and Order By clause pairs that contain the one or more selected and distinct expressions are shortened by removing the one or more selected and distinct expressions. At block 324 of FIG. 3D, the one or more selected and distinct expressions are added to the respective orderings corresponding to the Partition By and Order By clause pairs.

To illustrate the steps of FIG. 2A, FIG. 2B, FIG. 3A, FIG. 3B, FIG. 3C, and FIG. 3D for determining Ordering Groups, assume that the set of window functions is WF={WF1, WF2, WF3, WF4, WF5, WF6, WF7, WF8} and that the corresponding set of initial Partition By and Order By clause pairs is PO={PO1, PO2, PO3, PO4, PO5, PO6, PO7, PO8}, where:

PO1=P(x, y, z) O( )
PO2=P(y, x) O( )
PO3=P(x) O( )
PO4=P(x, y) O(a)
PO5=P(x, y) O(b)
PO6=P(x, y, z) O(a)
PO7=P(y, x) O(z, a)
PO8=P(y) O(x, z, a)

From the above set, PO3 and PO8 have Partition By clauses that contain the least number of expressions. Thus, the set of distinct expressions is {x, y}. For each distinct expression, a corresponding subset of Ordering Groups is determined where each subset has an ordering beginning with the particular expression. Thus, a subset of Ordering Groups with orderings beginning with "x" is determined, and another subset with orderings beginning with "y" is determined. These subsets are described below.

SUBSET OF ORDERING GROUPS BEGINNING WITH DISTINCT EXPRESSION X

From the above set PO={PO1, PO2, PO3, PO4, PO5, PO6, PO7, PO8}, a subset of Partition By and Order By clause pairs is determined, where each Partition By and Order By clause pair has a Partition By clause that contains "x" from the set of distinct expressions {x, y}.

The subset of Partition By and Order By clause pairs where each Partition By and Order By clause pair has a Partition By clause that contains "x" is {PO1, PO2, PO3, PO4, PO5, PO6, PO7} because the Partition By clause of PO8 is the only one that does not contain "x". The Partition By and Order By clause pairs in the subset are shortened by removing "x" from each Partition By and Order By clause pair to form PO'={PO1', PO2', PO3', PO4', PO5', PO6', PO7'}, where:

PO1'=P(y, z) O( )
PO2=P(y) O( )
PO3'=P( ) O( )←satisfied
PO4'=P(y) O(a)
PO5'=P(y) O(b)
PO6'=P(y, z) O(a)
PO7'=P(y) O(z, a)

An ordering containing the removed "x" is created for each Partition By and Order By clause pair of the subset {PO1, PO2, PO3, PO4, PO5, PO6, PO7} from which "x" was removed. It is then determined which Partition By and Order By clause pair is satisfied by its corresponding ordering. Only PO3' can be satisfied by the ordering {x}, i.e., by sorting on {x}. What is meant by the statement "PO3' can be satisfied by the ordering {x}" is that the sorting requirements of the corresponding window function WF3 is satisfied by sorting on {x}. The process of determining one or more Partition By clauses with the least number of expressions from among the Partition By and Order By clause pairs that remain to be satisfied and the shortening of the Partition By and Order By clause pairs in the subset is recursively repeated until all the shortened Partition By and Order By clause pairs are satisfied.

From among the Partition By and Order By clauses that remain to be satisfied in PO'={PO1', PO2', PO3', PO4', PO5', PO6', PO7'}, PO2', PO4', PO5' and PO7' have the least number of expressions in their respective Partition By clauses, namely the expression "y". The Partition By and Order By clause pairs that contain "y" are then shortened by removing "y" to form PO"={PO1", PO2", PO3", PO4", PO5", PO6", PO7"}, where:

PO1"=P(z) O( )
PO2"=P( ) O( )→satisfied
PO3"=P( ) O( )→satisfied
PO4"=P( ) O(a)
PO5"=P( ) O(b)
PO6"=P(z) O(a)
PO7"=P( ) O(z, a)

The removed "y" is added to the corresponding ordering for each Partition By and Order By clause pair from which "y" was removed. It is then determined which Partition By and Order By clause pair is satisfied by its corresponding ordering. Only PO2" can be satisfied by the ordering {x, y}, i.e. by sorting on {x, y}, and PO3" can be satisfied by any ordering beginning with {x} as before. From among the Partition By and Order By clauses that remain to be satisfied in PO"={PO1", PO2", PO3", PO4", PO5", PO6", PO7"}, it is determined that PO1", PO6" have the least number of expressions in their respective Partition By clauses, namely "z". In addition, PO4", PO5", PO7" have the least number of expressions in their respective Partition By clauses because they are empty. (This is same as having one Partition By expression, as described before.) The selected expressions with respect to PO4", PO5", PO7" are {a, b, z}, which are the first expression in the Order By clause of PO4", PO5", PO7", respectively. Any duplicate expression, "z" in this case, is discarded. Thus, the set of selected distinct expressions with respect to PO1", PO6", PO4", PO5", PO7"is {z, a, b}. The Partition By and Order By clause pairs that remain to be satisfied are then shortened by removing either, "z", "a", or "b" depending on whether "z", "a", or "b" was their respective least number of expression, to form PO'"={PO1'", PO2'", PO3'", PO4'", PO5'", PO6'", PO7'"}, where:

PO1'"=P( ) O( )→satisfied
PO2'"=P( ) O( )→satisfied
PO3'"=P( ) O( )→satisfied
PO4'"=P( ) O( )→satisfied
PO5'"=P( ) O( )→satisfied
PO6'"=P( ) O(a)
PO7'"=P( ) O(a)

The removed "z, or a or b" is added to the corresponding ordering for each Partition By and Order By clause pair from which "z, or a, or b" was removed. It is then determined which Partition By and Order By clause pair is satisfied by its corresponding ordering. PO1'" can be satisfied by an ordering on {x, y, z}. PO2'" can be satisfied by an ordering {x, y} and PO3'" can be satisfied by an ordering {x} as before. PO4'" can be satisfied by an ordering on {x, y, a}. PO5'" can be satisfied by an ordering on {x, y, b} . Only PO6'" and PO7'" remain to be satisfied.

From among the Partition By and Order By clauses that remain to be satisfied in PO'"={PO'", PO2'", PO3'", PO4'", PO5'", PO6'", PO7'"}, it is determined that PO6'" and PO7'" have the least number of expressions in their respective Partition By clauses because they are empty. Thus, the set of distinct expressions is {a}. The Partition By and Order By clause pairs that remain to be satisfied are then shortened by removing "a", to form PO""={PO1"", PO2"", PO3"", PO4"", PO5"", PO6"", PO7""}, where:

PO1""=P( ) O( )←satisfied
PO2""=P( ) O( )←satisfied
PO3""=P( ) O( )←satisfied
PO4""=P( ) O( )←satisfied
PO5""=P( ) O( )←satisfied
PO6""=P( ) O( )←satisfied
PO7""=P( ) O( )←satisfied The removed "a" is added to the corresponding ordering for each Partition By and Order By clause pair from which "a" was removed. It is then determined which Partition By and Order By clause pair is satisfied by its corresponding ordering. Thus, PO6"" and PO7"" can be satisfied by an ordering on {x, y, z, a}. PO1"" can be satisfied by an ordering on {x, y, z}, as before. PO2"" can be satisfied by an ordering {x, y}, as before. PO3"" can be satisfied by an ordering {x}, as before. PO4"" can be satisfied by an ordering on {x, y, a}, as before. PO5"" can be satisfied by an ordering on {x, y, b}, as before.

Thus, the Partition By and Order By clause pairs whose orderings begin with "x" are as follows:

{PO1, PO2, PO3, PO6, PO7}→satisfied by a sort on {x, y, z, a}
{PO2, PO3, PO4}→satisfied by a sort on {x, y, a}
{PO2, PO3, PO5}→satisfied by a sort on {x, y, b}

Thus, the subset of Ordering Groups whose orderings begin with "x" are as follows:

{WF1, WF2, WF3, WF6, WF7}→satisfied by a sort on {x, y, z, a}
{WF2, WF3, WF4}→satisfied by a sort on {x, y, a}
{WF2, WF3, WF5}→satisfied by a sort on {x, y, b}

SUBSET OF ORDERING GROUPS BEGINNING WITH Y

From the above set PO={PO1, PO2, PO3, PO4, PO5, PO6, PO7, PO8}, a subset of Partition By and Order By clause pairs is determined, where each Partition By and Order By clause pair has a Partition By clause that contains "y" from the set of distinct expressions {x, y}. The subset of Partition By and Order By clause pairs where each Partition By and Order By clause pair has a Partition By clause that contains "y" is {PO1, PO2, PO4, PO5, PO6, PO7, PO8} because the Partition By clause of PO3 is the only one that does not contain "y". The Partition By and Order By clause pairs in the subset are shortened by removing "y" from each Partition By and Order By clause pair to form PO'={PO1', PO2', PO4', PO5', PO6', PO7', PO8'}, where:

PO1'=P(x, z) O( )
PO2'=P(x) O( )
PO4'=P(x) O(a)
PO5'=P(x) O(b)
PO6'=P(x, z) O(a)
PO7'=P(x) O(z, a)
PO8'=P( ) O(x, z, a)

An ordering containing the removed "y" is created for each Partition By and Order By clause pair of the subset {PO1, PO2, PO4, PO5, PO6, PO7, PO8} from which "y" was removed. It is then determined which Partition By and Order By clause pair is satisfied by its corresponding ordering. No Partition By and Order By clause pair is satisfied by an ordering on {y}, thus far. The process of determining one or more Partition By clauses with the least number of expressions from among the Partition By and Order By clause pairs that remain to be satisfied and the shortening of the Partition By and Order By clause pairs in the subset is recursively repeated until all the shortened Partition By and Order By clause pairs are satisfied.

From among the Partition By and Order By clauses that remain to be satisfied in PO'={PO1', PO2', PO4', PO5', PO6', PO7', PO8'}, PO8' has the least number of expressions in its Partition By clause because the Partition By clause in PO8' is empty. Because the Partition By clause in PO8' is empty, the selected set of distinct expressions is {x}, which is the first expression in the Order By clause of PO8'. The Partition By and Order By clause pairs that contain "x" are then shortened by removing "x" to form PO"={PO1", PO2", PO4", PO5", PO6", PO7", PO8"}, where:

PO1"=P(z) O( )
PO2"=P( ) O( )←satisfied
PO4"=P( ) O(a)
PO5"=P( ) O(b)
PO6"=P(z) O(a)
PO7"=P( ) O(z, a)
PO8"=P( ) O(z, a)

The removed "x" is added to the corresponding ordering for each Partition By and Order By clause pair from which "x" was removed. It is then determined which Partition By and Order By clause pair is satisfied by its corresponding ordering. Only PO2" can be satisfied by the ordering {y, x}, i.e. by sorting on {y, x}. From among the Partition By and Order By clauses that remain to be satisfied in PO"={PO1", PO2", PO4", PO5", PO6", PO7", PO8"}, it is determined that PO1", PO6" have the least number of expressions in their respective Partition By clauses, namely "z". In addition, PO4", PO5", PO7", PO8" have the least number of expressions in their respective Partition By clauses because their respective Partition By clauses are empty. Thus, the selected set of distinct expressions is {z, a, b}, after discarding duplicate selected expressions. The Partition By and Order By clause pairs that remain to be satisfied are then shortened by removing either, "z", "a", or "b" depending on whether "z", "a", or "b" was their respective least number of expression, to form PO'''={PO1''', PO2''', PO4''', PO5''', PO6''', PO7''', PO8'''}, where:

PO1'''=P( ) O( )←satisfied
PO2'''=P( ) O( )←satisfied
PO4'''=P( ) O( )←satisfied
PO5'''=P( ) O( )←satisfied
PO6'''=P( ) O(a)
PO7'''=P( ) O(a)
PO8'''=P( ) O(a)

The removed "z, or a or b" is added to the corresponding ordering for each Partition By and Order By clause pair from which "z, or a, or b" was removed. It is then determined which Partition By and Order By clause pair is satisfied by its corresponding ordering. PO1''' can be satisfied by an ordering on {y, x, z}. PO2''' can be satisfied by an ordering {y, x}, as before. PO4''' can be satisfied by an ordering on {y, x, a}. PO5''' can be satisfied by an ordering on {y, x, b}. Only PO6''', PO7''', PO8''' remain to be satisfied.

From among the Partition By and Order By clauses that remain to be satisfied in PO'''={PO1''', PO2''', PO4''', PO5''', PO6''', PO7''', PO8'''}, it is determined that PO6''', PO7''', PO8''' have the least number of expressions in their respective Partition By clauses because their respective Partition By clauses are empty. Thus, the set of selected distinct expressions is {a}. The Partition By and Order By clause pairs that remain to be satisfied are then shortened by removing "a", to form PO''''={PO1'''', PO2'''', PO4'''', PO5'''', PO6'''', PO7'''', PO8''''},where:

PO1''''=P( ) O( )←satisfied
PO2''''=P( ) O( )←satisfied
PO4''''=P( ) O( )←satisfied
PO5''''=P( ) O( )←satisfied
PO6''''=P( ) O( )←satisfied
PO7''''=P( ) O( )←satisfied
PO8''''=P( ) O( )←satisfied The removed "a", is added to the corresponding ordering for each Partition By and Order By clause pair from which "a" was removed. It is then determined which Partition By and Order By clause pair is satisfied by its corresponding ordering. Thus, PO6'''', PO7'''', PO8'''' can be satisfied by an ordering on {y, x, z, a}. PO1''' can be satisfied by an ordering on {y, x, z}, as before. PO2''' can be satisfied by an ordering {y, x}, as before. PO4''' can be satisfied by an ordering on {y, x, a}, s before. PO5''' can be satisfied by an ordering on {y, x, b}, as before.

Thus, the Partition By and Order By clause pairs whose orderings begin with "y" are as follows:

{PO1, PO2, PO6, PO7, PO8}→satisfied by a sort on {y, x, z, a}
{PO2, PO4}→satisfied by a sort on {y, x, a}
{PO2, PO5}→satisfied by a sort on {y, x, b}

Thus, the subset of Ordering Groups whose orderings begin with "y" are as follows:

{WF1, WF2, WF6, WF7, WF8}→satisfied by a sort on {y, x, z, a}
{WF2, WF4}→satisfied by a sort on {y, x, a}
{WF2, WF5}→satisfied by a sort on {y, x, b}

MOTHER SET OF ORDERING GROUPS

The mother set of Ordering Groups is created by grouping together the subsets of Ordering Groups as explained at block 214 of FIG. 2B. Thus, the mother set of Ordering Groups with respect to PO={PO1, PO2, PO3, PO4, PO5, PO6, PO7, PO8}, which represents the set of window functions, WF={WF1, WF2, WF3, WF4, WF5, WF6, WF7, WF8} includes the following Ordering Groups:

{WF1, WF2, WF3, WF6, WF7}→satisfied by a sort on {x, y, z, a}
{WF2, WF3, W4}→satisfied by a sort on {x, y, a}
{WF2, WF3, WF5}→satisfied by a sort on {x, y, b}
{WF1, WF2, WF6, WF7, WF8}→satisfied by a sort on {y, x, z, a}
{WF2, WF4}→satisfied by a sort on {y, x, a}
{WF2, WF5}→satisfied by a sort on {y, x, b}

MINIMAL SET OF ORDERING GROUPS

Figure 4:
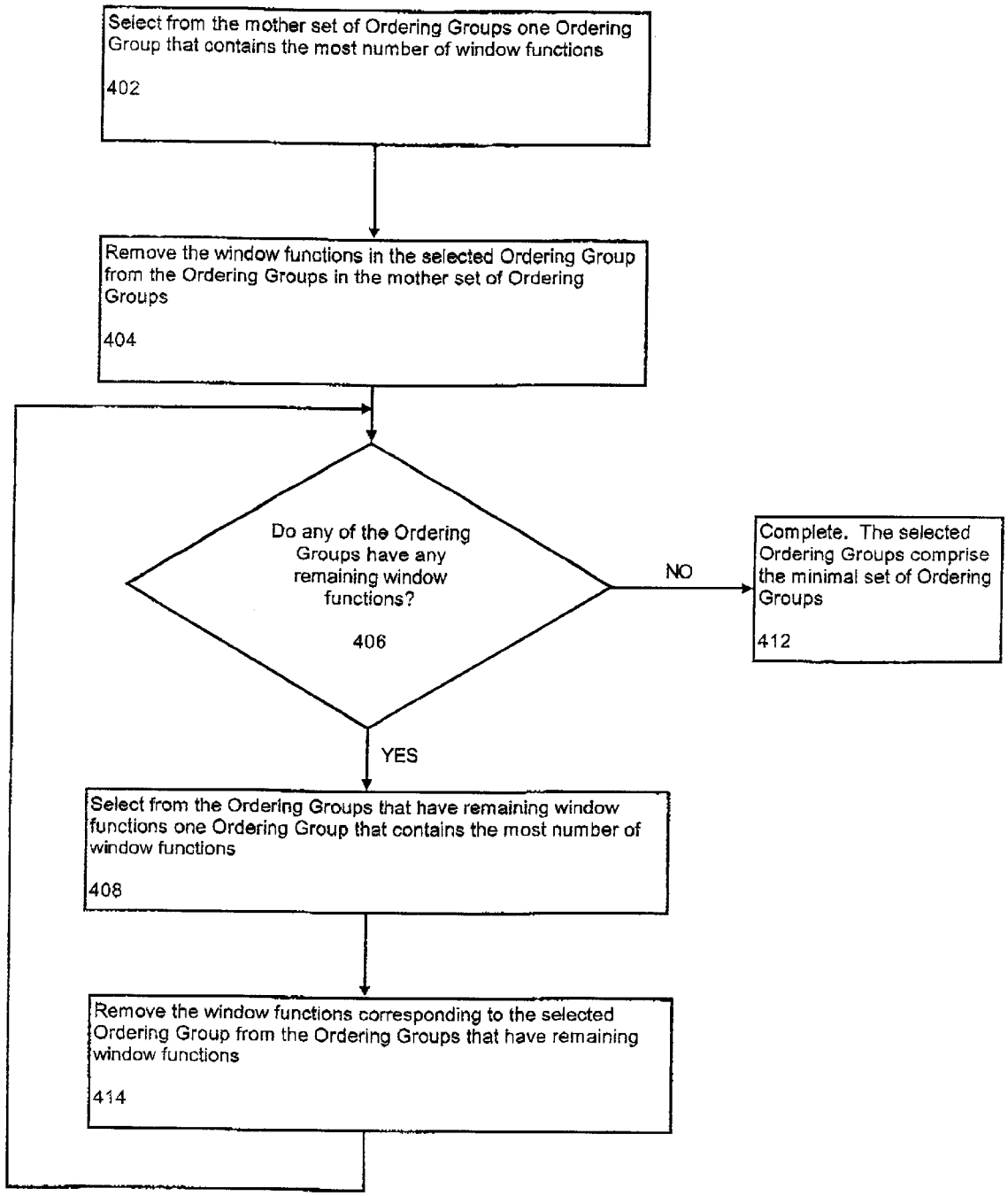
FIG. 4 is a flowchart that describes a technique for selecting a minimal set of Ordering Groups.

According to one embodiment, FIG. 4 describes a technique for selecting a minimal set of Ordering Groups. At block 402, one Ordering Group that contains the most number of window functions is selected from the mother set of Ordering Groups that was previously determined for a set of window functions, and which is described herein. At block 404, the window functions in the selected Ordering Group are removed from the Ordering Groups in the mother set of Ordering Groups. At block 406, it is determined whether any of the Ordering Groups have any remaining window functions. If no Ordering Groups have any remaining window functions, then the process of determining a minimal set of Ordering Groups is complete, and the selected Ordering Groups comprise the minimal set of Ordering Groups as indicated at block 412.

If it is determined that there are Ordering Groups that have remaining window functions, then at block 408, one Ordering Group that contains the most number of window functions is selected from the Ordering Groups that have remaining window functions. At block 414, the window functions in the selected Ordering Group are removed from the Ordering Groups that have remaining window functions. Control then passes back to block 406.

For example, assume that the mother set of Ordering Groups includes the following Ordering Groups:

A={WF1, WF2, WF3, WF6, WF7}→satisfied by a sort on {x, y, z, a}
B={WF2, WF3, W4}→satisfied by a sort on {x, y, a}
C={WF2, WF3, WF5}→satisfied by a sort on {x, y, b}
D={WF1, WF2, WF6, WF7, WF8}→satisfied by a sort on {y, x, z, a}
E={WF2, WF4}→satisfied by a sort on {y, x, a}
F={WF2, WF5}→satisfied by a sort on {y, x, b}

The Ordering Groups that contain the most number of window functions are A and D. either A or D may be selected. Assume that A is selected. The window functions of A are {WF1, WF2, WF3, WF6, WF7}. Thus, {WF1, WF2, WF3, WF6, WF7} are removed from A, B, C, D, E, F to produce the following:

B'={WF4}→satisfied by a sort on {x, y, a}
C'={WF5}→satisfied by a sort on {x, y, b}
D'={WF8}→satisfied by a sort on {y, x, z, a}
E'={WF4}→satisfied by a sort on {y, x, a}
F'={WF5}→satisfied by a sort on {y, x, b}

A' is the null set and is not shown. The Ordering Groups that contain the most number of window functions are selected from Ordering Groups that have remaining window functions. B', C', D', E', F' are the ordering Groups that have remaining window functions. Since B', C', D', E', F' each contain the same number of window functions, any one of them may be selected. Assume that D' is selected. The window function of D' is {WF8} . Thus, {WF8} is removed from B', C', D', E', F' to produce the following:

B"={WF4}→satisfied by a sort on {x, y, a}
C"={WF5}→satisfied by a sort on {x, y, b}
E"={WF4}→satisfied by a sort on {y, x, a}
F"={WF5}→satisfied by a sort on {y, x, b}

Since B", C", E", F" each contain the same number of window functions, any one of them maybe selected. Assume that B" is selected. The window function of B" is {WF4} .

Thus, {WF4} is removed from B", C", E", F" to produce the following:

C"'={WF5}→satisfied by a sort on {x, y, b}
F"'={WF5}→satisfied by a sort on {y, x, b}

Since C"', F"' each contain the same number of window functions, any one of them may be selected. Assume that C"' is selected. The window function of C"' is {WF5}. Thus, {WF8} is removed from C"', F"'.

The minimal set of Ordering groups is made up of the selected Ordering Groups A D', B", C"'. Thus, the minimal set of Ordering Groups include the following:

A={WF1, WF2, WF3, WF6, WF7}→satisfied by a sort on {x, y, z, a}
D'={WF8}→satisfied by a sort on {y, x, z, a}
B"={WF4}→satisfied by a sort on {x, y, a}
C"'={WF5}→satisfied by a sort on {x, y, b}

HARDWARE OVERVIEW

Figure 5:
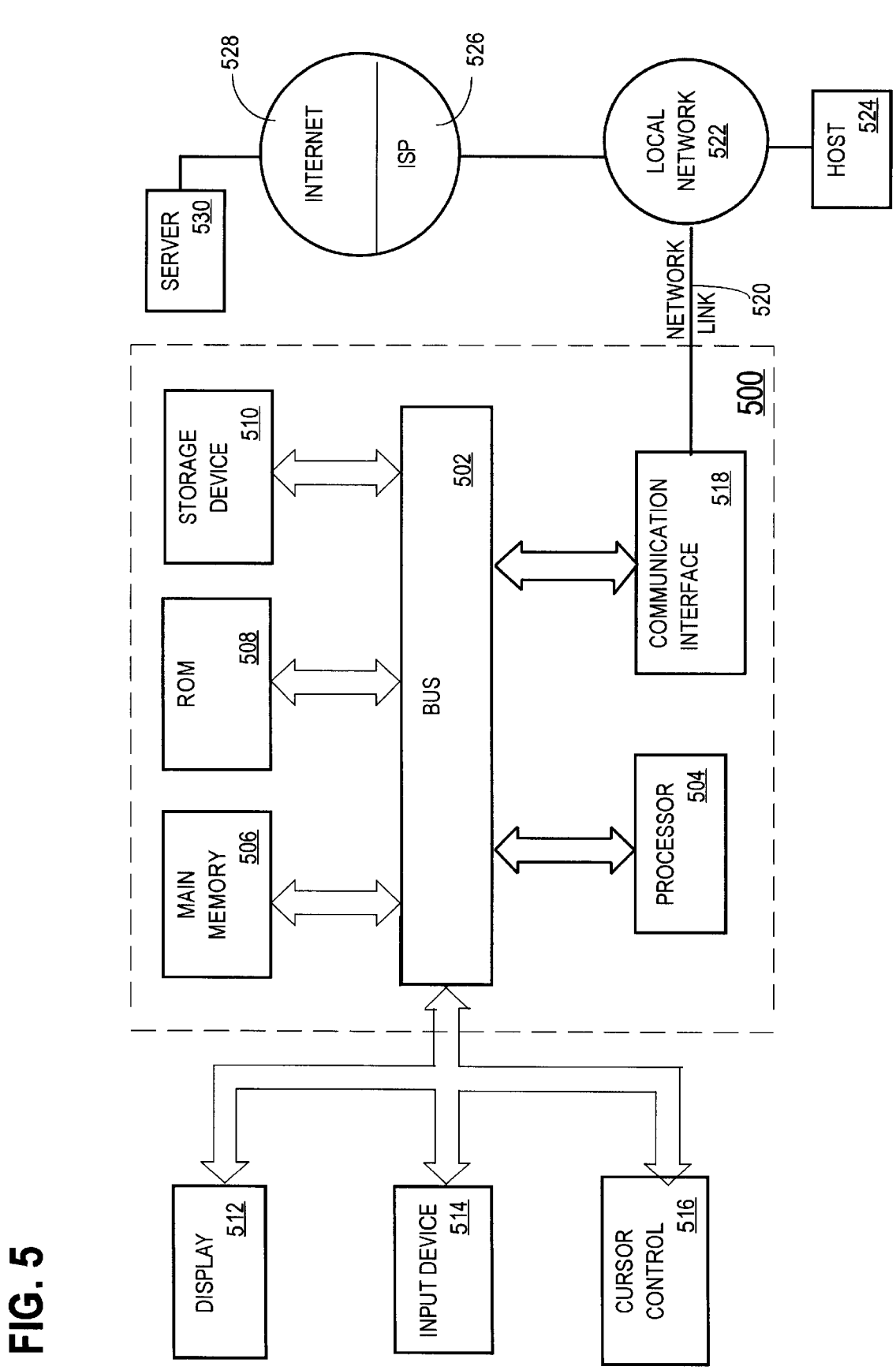
FIG. 5 depicts a computer upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 maybe a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.
SCOPE In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reducing how many sort operations are performed to satisfy a query containing a set of window functions, the method comprising the computer-implemented steps of:

grouping the window functions in the set of window functions into a set of Ordering Groups, wherein each Ordering Group in the set of Ordering Groups is a subset of the set of window functions and wherein each Ordering Group can be satisfied by a single sort operation;

selecting from the set of Ordering Groups a minimal set of Ordering Groups, wherein the minimal set of Ordering Groups corresponds to a reduced number of sort operations needed to satisfy sorting requirements of the window functions in the set of window functions; and to generate a result set for the query, performing the sort operations associated with the Ordering Groups that belong to the minimal set of Ordering Groups.

2. The method of claim 1, further comprising converting any Group By and Order By clauses in the query block into window functions for inclusion in the set of window functions before determining the set of Ordering Groups.

3. The method of claim 1, wherein determining a set of Ordering Groups comprises:

(a) determining from the set of window functions a corresponding initial set of Partition By clause and Order By clause pairs, wherein each Partition By clause and Order By clause pair is associated with a corresponding window function from the set of window functions;

(b) determining from the initial set of Partition By clause and Order By clause pairs one or more Partition By clauses with a least number of expressions;

(c) selecting the one or more expressions in each Partition By clause that has the least number of expressions;

(d) creating and storing a set of distinct expressions from the one or more selected expressions by discarding duplicate expressions; and (e) determining for each distinct expression in the set of distinct expressions a corresponding subset of Ordering Groups wherein each Ordering Group in the subset of Ordering Groups has an ordering beginning with the distinct expression;

(f) if the set of Ordering Groups already exists, then adding to the set the subset of Ordering Groups that was determined for each distinct expression, otherwise creating the set of Ordering Groups by designating as the set of Ordering Groups a set comprising the subsets of Ordering Groups;

(g) determining whether all the window functions have been included in the set of Ordering Groups;

(h) if all the window functions have not been included in the set of Ordering Groups, then removing the window functions that have been included in the set from the initial set of Partition By & Order By clause pairs; and (i) repeating steps (b), (c), (d), (e), (f), (g), (h) until all the window functions have been included in the set of Ordering Groups.

4. The method of claim 3, wherein the Partition By clause of the Partition By and Order By clause pair is empty and the Order By clause of the Partition By and Order By clause pair is not empty.

5. The method of claim 3, wherein the Partition By clause of the Partition By and Order By clause pair is not empty and the Order By clause of the Partition By and Order By clause pair is empty.

6. The method of claim 3, wherein the Partition By clause of the Partition By and Order By clause pair is not empty and the Order By clause of the Partition By and Order By clause pair is not empty.

7. The method of claim 3, wherein determining for each distinct expression in the set of distinct expressions a corresponding subset of Ordering Groups wherein each Ordering Group in the subset of Ordering Groups has an ordering beginning with the distinct expression comprises:
  determining from the initial set of Partition By clause and Order By clause pairs a subset of Partition By clause and Order By clause pairs wherein each Partition By clause and Order By clause pair in the subset of Partition By clause and Order By clause pairs contain the distinct expression;
  shortening the Partition By clause and Order By clause pairs in the subset of Partition By clause and Order By clause pairs by removing the distinct expression from the Partition By clause and Order By clause pairs;
  creating and storing corresponding to each Partition By clause and Order By clause pair an ordering beginning with the distinct expression; and
  when all the Partition By clause and Order By clause pairs that were shortened and that were in the subset of Partition By clause and Order By clause pairs are satisfied by their corresponding orderings, grouping the Partition By clause and Order By clause pairs into groups based on their corresponding orderings, wherein each group is capable of being satisfied by one sort operation;
  converting the groups of Partition By clause and Order By clause pairs into corresponding groups of window functions; and
  designating the groups of window functions as the corresponding subset of Ordering Groups wherein each Ordering Group in the subset of Ordering Groups has an ordering beginning with the distinct expression.

8. The method of claim 7, further comprising repeating the following steps until all the shortened Partition By clause and Order By clause pairs in the subset of Partition By clause and Order By clause pairs are satisfied by their corresponding orderings:
  determining from the subset of Partition By clause and Order By clause pairs one or more Partition By clauses that contain the least number of expressions;
  determining whether the one or more Partition By clauses that contain the least number of expressions is empty;
  selecting one or more expressions in each of the one or more Partition By clauses when the one or more Partition By clauses that contain the least number of expressions are not empty;
  selecting a first expression from the Order By clause in each Partition By clause and Order By clause pair that contains an empty Partition By clause when the one or more Partition By clauses that contain the least number of expressions are empty;
  shortening the Partition By clause and Order By clause pairs in the subset of Partition By clause and Order By clause pairs by removing the one or more selected expressions from each Partition By clause and Order By clause pair; and
  adding the one or more selected expressions to the ordering corresponding to each Partition By clause and Order By clause pair.

9. The method of claim 1, wherein selecting from the set of Ordering Groups a minimal set of Ordering Groups comprises:
  selecting from the set of Ordering Groups a first selected Ordering Group that contain the most number of window functions;
  removing the window functions in the first selected Ordering Group from the Ordering Groups in the set of Ordering Groups;
  repeating the following steps until none of the Ordering Groups have any remaining window functions:
    determining whether any Ordering Groups have remaining window functions;
    selecting a second selected Ordering Group that contains the most number of window functions from the Ordering Groups that have remaining window functions;
    removing the window functions in the second selected Ordering Group from the Ordering Groups have remaining window functions; and
  creating the minimal set of Ordering Groups by designating as the minimal set of Ordering Groups a set comprising all the selected Ordering Groups.

10. A computer-readable medium bearing instructions for reducing how many sort operations are performed to satisfy a query containing a set of window functions, the computer-readable medium comprising instructions for performing the steps of:
  grouping the window functions in the set of window functions into a set of Ordering Groups, wherein each Ordering Group in the set of Ordering Groups is a subset of the set of window functions and wherein each Ordering Group can be satisfied by a single sort operation;
  selecting from the set of Ordering Groups a minimal set of Ordering Groups, wherein the minimal set of Ordering Groups corresponds to a reduced number of sort operations needed to satisfy sorting requirements of the window functions in the set of window functions; and
  to generate a result set for the query, performing the sort operations associated with the Ordering Groups that belong to the minimal set of Ordering Groups.

11. The computer-readable medium of claim 10, further comprising converting any Group By and Order By clauses in the query block into window functions for inclusion in the set of window functions before determining the set of Ordering Groups.

12. The computer-readable medium of claim 10, wherein determining a set of Ordering Groups comprises:
  (a) determining from the set of window functions a corresponding initial set of Partition By clause and Order By clause pairs, wherein each Partition By clause and Order By clause pair is associated with a corresponding window function from the set of window functions;
  (b) determining from the initial set of Partition By clause and Order By clause pairs one or more Partition By clauses with a least number of expressions;
  (c) selecting the one or more expressions in each Partition By clause that has the least number of expressions;

(d) creating and storing a set of distinct expressions from the one or more selected expressions by discarding duplicate expressions; and (e) determining for each distinct expression in the set of distinct expressions a corresponding subset of Ordering Groups wherein each Ordering Group in the subset of Ordering Groups has an ordering beginning with the distinct expression;

(f) if the set of Ordering Groups already exists, then adding to the set the subset of Ordering Groups that was determined for each distinct expression, otherwise creating the set of Ordering Groups by designating as the set of Ordering Groups a set comprising the subsets of Ordering Groups;

(g) determining whether all the window functions have been included in the set of Ordering Groups;

(h) if all the window functions have not been included in the set of Ordering Groups, then removing the window functions that have been included in the set from the initial set of Partition By & Order By clause pairs; and (i) repeating steps (b), (c), (d), (e), (f), (g), (h) until all the window functions have been included in the set of Ordering Groups.

13. The computer-readable medium of claim 12, wherein the Partition By clause of the Partition By and Order By clause pair is empty and the Order By clause of the Partition By and Order By clause pair is not empty.

14. The computer-readable medium of claim 12, wherein the Partition By clause of the Partition By and Order By clause pair is not empty and the Order By clause of the Partition By and Order By clause pair is empty.

15. The computer-readable medium of claim 12, wherein the Partition By clause of the Partition By and Order By clause pair is not empty and the Order By clause of the Partition By and Order By clause pair is not empty.

16. The computer-readable medium of claim 12, wherein determining for each distinct expression in the set of distinct expressions a corresponding subset of Ordering Groups wherein each Ordering Group in the subset of Ordering Groups has an ordering beginning with the distinct expression comprises:

determining from the initial set of Partition By clause and Order By clause pairs a subset of Partition By clause and Order By clause pairs wherein each Partition By clause and Order By clause pair in the subset of Partition By clause and Order By clause pairs contain the distinct expression;

shortening the Partition By clause and Order By clause pairs in the subset of Partition By clause and Order By clause pairs by removing the distinct expression from the Partition By clause and Order By clause pairs;

creating and storing corresponding to each Partition By clause and Order By clause pair an ordering beginning with the distinct expression; and when all the Partition By clause and Order By clause pairs that were shortened and that were in the subset of Partition By clause and Order By clause pairs are satisfied by their corresponding orderings, grouping the Partition By clause and Order By clause pairs into groups based on their corresponding orderings, wherein each group is capable of being satisfied by one sort operation;

converting the groups of Partition By clause and Order By clause pairs into corresponding groups of window functions; and designating the groups of window functions as the corresponding subset of Ordering Groups wherein each Ordering Group in the subset of Ordering Groups has an ordering beginning with the distinct expression.

17. The computer-readable medium of claim 16, further comprising repeating the following steps until all the shortened Partition By clause and Order By clause pairs in the subset of Partition By clause and Order By clause pairs are satisfied by their corresponding orderings:

determining from the subset of Partition By clause and Order By clause pairs one or more Partition By clauses that contain the least number of expressions;

determining whether the one or more Partition By clauses that contain the least number of expressions is empty;

selecting one or more expressions in each of the one or more Partition By clauses when the one or more Partition By clauses that contain the least number of expressions are not empty;

selecting a first expression from the Order By clause in each Partition By clause and Order By clause pair that contains an empty Partition By clause when the one or more Partition By clauses that contain the least number of expressions are empty;

shortening the Partition By clause and Order By clause pairs in the subset of Partition By clause and Order By clause pairs by removing the one or more selected expressions from each Partition By clause and Order By clause pair; and adding the one or more selected expressions to the ordering corresponding to each Partition By clause and Order By clause pair.

18. The computer-readable medium of claim 10, wherein selecting from the set of Ordering Groups a minimal set of Ordering Groups comprises:

selecting from the set of Ordering Groups a first selected Ordering Group that contain the most number of window functions;

removing the window functions in the first selected Ordering Group from the Ordering Groups in the set of Ordering Groups;

repeating the following steps until none of the Ordering Groups have any remaining window functions:
determining whether any Ordering Groups have remaining window functions;
selecting a second selected Ordering Group that contains the most number of window functions from the Ordering Groups that have remaining window functions;
removing the window functions in the second selected Ordering Group from the Ordering Groups have remaining window functions; and creating the minimal set of Ordering Groups by designating as the minimal set of Ordering Groups a set comprising all the selected Ordering Groups.

* * * * *